Jan. 31, 1967       R. A. SANFORD       3,301,090
ELECTROLYTIC BALANCING APPARATUS
Filed Oct. 17, 1963                     2 Sheets-Sheet 1

INVENTOR.
ROBERT A. SANFORD
BY
HIS ATTORNEY

Jan. 31, 1967 R. A. SANFORD 3,301,090
ELECTROLYTIC BALANCING APPARATUS
Filed Oct. 17, 1963 2 Sheets-Sheet 2
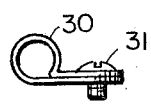
FIG. 3
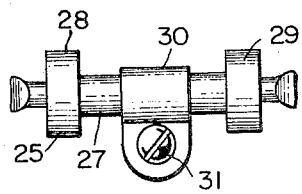
FIG. 4
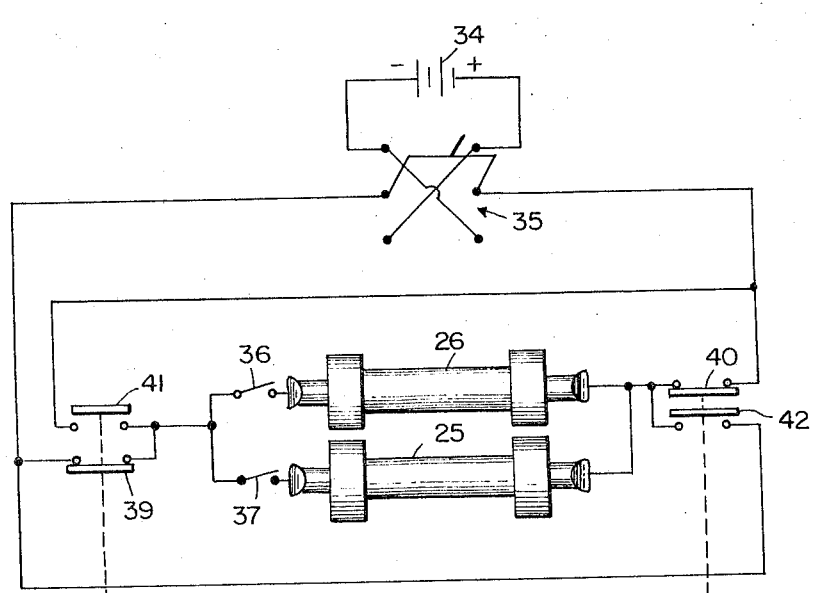
FIG. 5
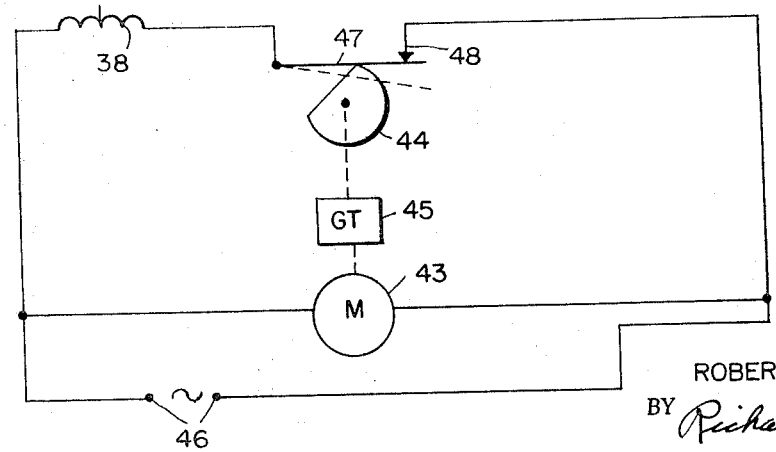
INVENTOR.
ROBERT A. SANFORD
BY Richard E. Hosley
HIS ATTORNEY United States Patent Office 3,301,090
Patented Jan. 31, 1967

3,301,090
ELECTROLYTIC BALANCING APPARATUS
Robert A. Sanford, Marblehead, Mass., assignor to General Electric Company, a corporation of New York
Filed Oct. 17, 1963, Ser. No. 317,027
6 Claims. (Cl. 74—573)

The present invention relates to balancing apparatus and more particularly to electrically controlled balancing apparatus suitable for balancing a rotatable body such as a gyroscope about an axis of rotation thereof.

Many rotatable devices, such as, for example, gyroscopes must be balanced during manufacture within very close tolerances. In the past it has been common practice to achieve mechanical balance by exhaustive trial and error mechanical techniques such as drilling small holes or the use of adjustable weights to precisely balance the gyroscope. Such balancing techniques are costly and require many adjustments by skilled operators over an extended period of time. Also, such mechanical balancing techniques are exceedingly difficult when applied to the problem of balancing gyros which are floated in a sealed container.

In order to overcome difficulties connected with balancing of gyroscopes, it has been proposed heretofore to utilize electrically controlled electrolytic balancing devices wherein the shifting of the balancing weight is accomplished by electrolytic transfer of metal between electrodes through an electrolyte. Such devices have not, however, proved satisfactory because of operating difficulties encountered. Thus, some electrolytic balancing devices evolve gas during operation and soon become inoperative. Others form excessive sludge or dendrites establishing an electrical conduction path between the electrodes causing a short circuit. In still others, the mass transfer rate is too slow to permit the balancing operation to be accomplished within a reasonable period of time.

Accordingly, it is an object of the present invention to provide improved electrolytic balancing apparatus utilizing a small sealed unit suitable for attachment to gyroscopes and other devices to achieve a delicate mass balancing operation.

Another object of the invention is to provide an electrolytic balancing apparatus having a higher mass transfer rate to permit the balancing operation to be accomplished in a relatively short period of time.

Another object of the invention is to provide electrolytic balancing apparatus having an improved electrical control system which reduces or eliminates gas evolution, is reversible as to the direction of mass transfer and which gives a denser plate on the electrodes than has been possible heretofore with devices of this type.

Further objects and advantages of this invention will become apparent as the following description proceeds.

Briefly, in accordance with the invention there is provided an electrolytic balancing apparatus comprising an electrolytic balancing cell adapted to be mounted on a rotatable member to be balanced. The balancing cell comprises a tubular member formed of electrically nonconducting material having ends closed and sealed by metal electrodes to form a liquid-tight electrolyte container. Mass transfer of metal between the electrodes for balancing-adjusting purposes is controlled electrically by passing a unidirectional plating current through the electrodes and the electrolyte, the direction of the mass transfer being controlled by the selection of the direction of the unidirectional plating current. A high rate of mass transfer is achieved by use of lead electrodes and a lead fluoborate electrolyte. A denser plate of the transferred metal and other operating advantages, including reduction or elimination of gas evolution during the plating process, may be obtained by periodically reversing the direction of the plating current. A net transfer of metal between the electrodes in either direction is controlled by a timing device which causes the plating current to flow in forward and reverse directions for unequal periods of time, the direction of the net transfer being selected by the use of a polarity-reversing switch.

For a better understanding of the invention, reference should be made to the following detailed description taken in connection with the accompanying drawings in which:

FIGURES 3 and 4 show details of an arrangement for mounting the balancing cell on the gyroscope gimbal; and FIGURE 5 is a circuit diagram illustrating a control system which may be used to improve operation of the balancing apparatus by periodically reversing the direction of the unidirectional plating current.

Figure 1:
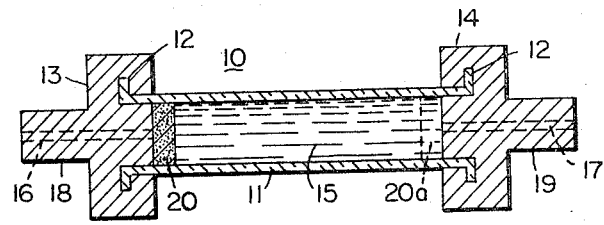
FIGURE 1 is a sectional view showing the construction of an electrolytic balancing cell forming a part of the balancing apparatus.

Referring now to FIGURE 1 of the drawing, the electrolytic balancing apparatus comprises a cell 10 having a tubular member 11 formed of electrically nonconducting material such as glass. The ends of the tubular member are open and are provided with outwardly projecting flanges 12 which act to anchor and securely position metallic electrodes 13 and 14. Preferably, the electrodes are formed of a high-purity lead which may, for example, be cast over the ends of the tubular member, the flanges 12 acting to securely anchor the electrodes in position to prevent axial movement thereof. It will be understood that the electrodes form a liquid-tight seal with the tubular member so that the electrodes and the tubular member form a liquid-tight container for an electrolyte 15 extending between and filling the gap between the electrodes. In the illustrated example wherein the electrodes are formed of lead, the electrolyte used is preferably lead fluoborate, which may be either an aqueous or non-aqueous solution. Good results have been obtained with the use of an aqueous solution with the lead fluoborate varying in concentration from 20% to 55%. In order to provide a convenient means for filling the balancing device with the electrolyte, holes 16 and 17 are drilled axially through the electrodes as indicated by the dotted lines 16 and 17. As shown, the electrodes have projections 18 and 19 which are crimped after the cell has been filled in order to close holes 16 and 17 passing therethrough and provide a liquid-tight cell. These same projections provide convenient tabs to which electrical connections to the electrodes may be made.

By passing a unidirectional plating current between the electrodes through the electrolyte, electrodeposition of electrode material occurs at either end of the tube depending upon the direction of current flow. For example, when the current flows from electrode 14 through the electrolyte to electrode 13, lead is removed from the electrode 14 and is deposited at the end of the tubular member 11 adjacent electrode 13, a layer of such deposited or plated metal being indicated, for example, by the shaded section 20 shown adjacent the left-hand end of the tubular member as viewed in FIGURE 1. It will be understood that when the direction of current flow is reversed, the layer 20 will be removed and deposited at the right-hand side of the tube indicated by the dotted section 20a, the amount of metal being so transferred or deposited depending upon the length of time the current flows.

In order to use the electrolytic cell of the type described above to balance a rotatable device, the cell is mounted on the device to be balanced so that the electrode ends of the cell lie on opposite sides of the rotational axis. By controlling the direction and duration of the current flow, the balance of the rotatable device about that axis can conveniently be adjusted as desired by transfer of metal between the electrodes located on opposite sides of the balance axis.

Figure 2:
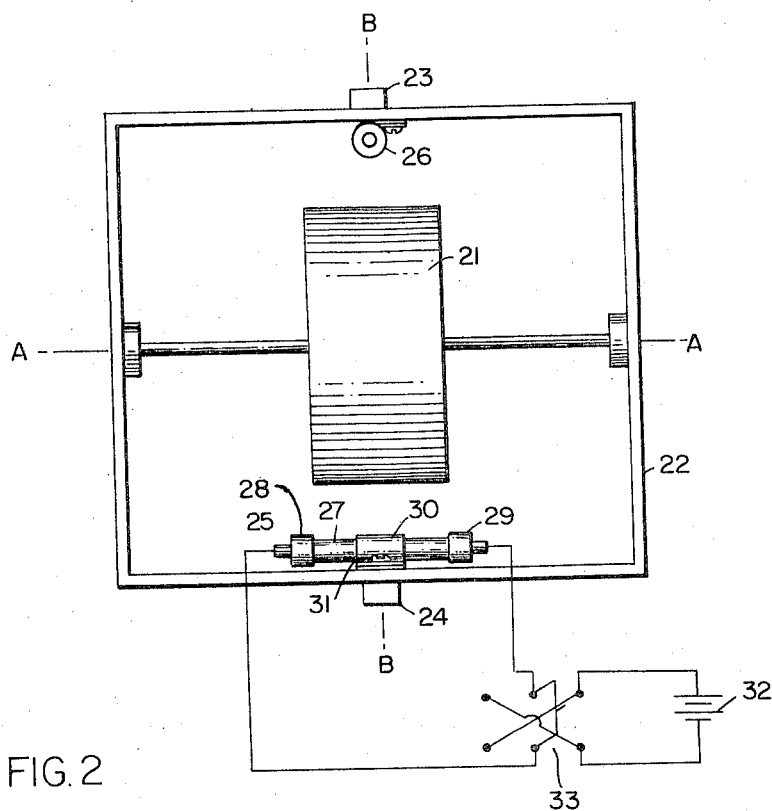
FIGURE 2 shows an application of the balancing apparatus to a gyroscope to achieve balance of the supporting gimbal of the gyroscope.

In order to illustrate a practical application of the electrolytic balancing apparatus, there is shown in FIGURE 2 of the drawing an arrangement wherein two such balancing cells are used to balance the gimbal of a gyroscope. For simplicity of illustration, there is shown a gyroscope mounted for one degree of freedom comprising a gyro rotor 21 rotationally mounted in a gimbal 22 so that its spin axis lies in the direction of the axis A—A. The gimbal 22 is provided with trunnions 23 and 24 by means of which the gimbal is mounted on a support, not shown, for rotation about the gimbal axis B—B. In order to provide a means of balancing the gimbal about the gimbal axis B—B, two electrolytic cells 25 and 26 are used. The cells 25 and 26 may be constructed in the same manner as the cell illustrated in FIGURE 1 and are shown as comprising a tubular member 27 having ends closed by electrodes 28 and 29. The tubular member 27 of the cell is mounted by a suitable clamping device so that the electrodes 28 and 29 lie on opposite sides of the axis B—B with the cell lying in a first balancing plane containing the axes A—A and B—B. As shown in FIGURES 3 and 4, the balancing cell may be mounted by means of a simple clamp 30 wrapped around the central portion of the cell with the two ends fastened together and secured to the gimbal by means of a suitable fastening means such as a screw 31. The electrodes 28 and 29 are connected to a suitable source of unidirectional current such as a battery 32 through a polarity-reversing switch 33. When the switch 33 is closed, a transfer of lead between electrodes 28 and 29 will take place, the direction of transfer being determined by the direction of current flow through the electrolyte as determined by the position of switch 33. Thus, by suitable manipulation of the switch, the gyro gimbal 22 may be conveniently balanced in the first balancing plane. To acquire balance in a second balancing plane perpendicular to the first balancing plane, the second balancing cell 26 is mounted on the other side of the gimbal so that the axis of the cell passing through the electrodes lies in the second balancing plane. It will be understood that similar electrical connections are made to the cell 26 through a polarity-reversing switch so that balance can be achieved in the second balancing plane. It will be understood that the electrical connections from the two balancing cells 25 and 26 are brought outside the gyroscope through suitable spirals or slip rings of known construction, the showing of which has been omitted for clarity.

An important advantage of the electrolytic balancing cell utilizing lead electrodes and a lead fluoborate electrolyte is the fact that mass transfer rate between the end electrodes for balancing purposes is much faster than has been possible heretofore. For example, tests made on the electrolytic balancing cell of the type shown in FIGURE 1 show that 48.2 mg. of lead were transferred over a distance of 10 mm. in an electrolyte consisting of 50% lead fluoborate aqueous solution over a period of seven hours. Thus, the rate of mass transfer for the system was 6.9 mg. per hour for a given set of experimental conditions. A cell of equivalent size having copper electrodes and an acidic copper-sulfate electrolyte required 100 hours to transfer 69.7 mg. of copper over the same distance employing the same experimental conditions. The rate of mass transfer was 0.697 mg. per hour or $\frac{1}{10}$ that of the lead-lead fluoborate cell. In addition, the lead-lead fluoborate cell is sludge free whereas in the copper-acidic copper-sulfate cell a significant amount of sludge was formed and gas was evolved. It will be appreciated that in a sealed type of electrolytic balancing cell of a type suitable for use as a gyro-balancing device, no significant amount of gas evolution can be tolerated since the evolution of gas or the formation of sludge between electrodes of a sealed cell will soon cause the cell to become inoperative.

In conventional open plating baths, it is common to provide means for mechanically stirring the electrolyte during the plating operation in order to prevent the formation of surface films on the electrodes which impair the efficiency of plating and tend to prevent the formation of a uniform dense plating. In a small, sealed electrolytic balancing cell of the type here involved, mechanical stirring of the electrolyte is not feasible. In accordance with another aspect of the present invention, it has been found that the efficiency of the plating operation in a sealed electrolytic balancing cell can be substantially improved by periodically reversing the direction of the electrodeposition of the metal by changing the polarity of the electrodes. A control system suitable for accomplishing this result is shown in FIGURE 5 of the drawing to which reference will now be made.

The balancing cells 25 and 26 are shown as being connected to a suitable source of unidirectional current such as a battery 34 through a solarity reversing switch 35 which permits the operator to control the direction in which the transfer of metal between the electrodes takes place as in the arrangement of FIGURE 2. Switches 36 and 37 in circuit with the balancers 25 and 26 permit selective control of the balancers. In addition, there is provided a reverse plate control device which periodically reverses the direction of current through the balancing devices so that the plating occurs in forward and reverse directions for unequal periods of time in order to effect a net transfer of metal between the electrodes in one direction or the other. It has been found that this periodic reversing of the plating current acts to improve the efficiency of the plating operation by giving a denser plate and by substantially reducing gas evolution. As shown, the reverse plate control may comprise a switching device comprising a reversing relay having an operating coil 38 actuating a pair of normally open contacts 39 and 40 and a pair of normally closed contacts 41 and 42. As shown, the relay contacts are connected in circuit with the balancing devices 25 and 26 so that when the relay is in the energized position shown, current passes through the balancing cells through a circuit including the normally open contacts 39 and 40 and when the relay is de-energized the current passes through the cell in the reverse direction through the contacts 41 and 42. The reversing relay is periodically opened and closed at unequal time intervals by means of a timing motor 43 which drives a rotating cam 44 through a suitable gear reduction 45. The motor and the reversing relay may, as shown, be energized from a suitable source of alternating current supplied to terminals 46. As shown, the cam 44 engages a pivoted lever 47 which, in the position shown, closes a switch 48 to energize the reversing relay. As shown, the cam 44 is shaped so that during more than half of its rotation the lever 47 is held in a position to close the switch 48. However, during another part of the rotational cycle, the cam permits the lever 47 to drop to a position shown by the dotted line opening switch 48 and de-energizing the reversing relay. The cam 47 may, for example, be contoured so that the switch 48 is closed during 60% of the cycle time and open 40% of the cycle time. The reversing relay thus is energized for a longer period of time than it is de-energized, and this results in a flow of current through the balancing devices in opposite directions in the ratio of 60% to 40%. Thus, since the mass of metal transferred between the electrodes of the balancing cell depends on the length of time the plating current flows, there is a net transfer of metal between the electrodes of the balancing cell in a direction dependent upon the position of the switch 35. Other equivalent arrangements for periodically reversing the direction of the plating current supplied to the balancing cells will be apparent to those skilled in the art.

While the reverse plating technique described above is not necessary for successful operation of the lead-lead fluoborate electrolytic balancing cells, its use with such cells improves the efficiency of operation by giving a denser deposit of metal on the electrodes, which is more resistant to shock and vibration. Further, it has been found that the reverse plating technique reduces or eliminates the formation of gas and sludge in electrolytic balancing cells using different electrode-electrolyte combinations making such use feasible. For example, tests have shown that the plating of copper from a copper-acidic copper-sulfate cell results in sludge formation, gas evolution and an irregular plate when the plating is done continuously. However, on employing the reverse plating technique, a dense, uniform copper deposit was obtained, a very small amount of sludge was formed, and gas evolution was reduced or eliminated.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. Electrolytic balancing apparatus for adjusting the balance of a rotatable body about an axis of rotation thereof comprising
    a tubular member formed of electrically nonconducting material and having open ends;
    means for mounting said tubular member on said body so that the ends thereof lie on opposite sides of said axis;
    a lead electrode mounted on each end of said tubular member to plug and seal the ends thereof and form a liquid-tight electrolyte container;
    a liquid electrolyte filling said container and the space between said electrodes, said electrolyte comprising an aqueous solution of lead fluoborate; and
    means by which a unidirectional electrical current is passed through said electrodes and electrolyte to effect an electrolytic transfer of lead between said electrodes through said electrolyte and thereby adjust the mass of said body about said axis.

2. Electrolytic balancing apparatus for adjusting the balance of a rotatable body about an axis of rotation thereof comprising
    a tubular member formed of electrically nonconducting material and having open ends;
    means for mounting said tubular member on said body so that the ends thereof lie on opposite sides of said axis;
    a lead electrode mounted on each end of said tubular member to plug and seal the ends thereof and form a liquid-tight electrolyte container;
    a liquid electrolyte filling said container and the space between said electrodes, said electrolyte comprising an aqueous solution of lead fluoborate;
    means by which a unidirectional electrical current is passed through said electrodes and electrolyte to effect an electrolytic transfer of lead between said electrodes through said electrolyte; and
    means for selecting the direction of the unidirectional current through the electrodes to control the direction of transfer of lead between the electrodes and thereby adjust the balance of the rotatable body.

3. Electrolytic balancing apparatus for adjusting the balance of a rotatable body about an axis of rotation thereof comprising
    a tubular member formed of electrically nonconducting material and having open ends;
    means for mounting said tubular member on said body so that the ends thereof lie on opposite sides of said axis;
    an electrode mounted on each end of said tubular member to plug and seal the ends thereof and form a liquid-tight electrolyte container;
    a liquid electrolyte filling said container and the space between said electrodes; and
    means including a switching device by which a unidirectional electrical current is periodically passed through said electrodes and electrolyte in alternating forward and reverse directions for unequal periods of time whereby to effect a net electrolytic transfer of electrode material between said electrodes through said electrolyte and thereby adjust the mass of said body about said axis.

4. Electrolytic balancing apparatus as set forth in claim 3 wherein the electrode is formed of lead and the electrolyte comprises an aqueous solution of lead fluoborate.

5. Electrolytic balancing apparatus for adjusting the balance of a rotatable body about an axis of rotation thereof comprising
    a tubular member formed of electrically nonconducting material and having open ends;
    means for mounting said tubular member on said body so that the ends thereof lie on opposite sides of said axis;
    an electrode mounted on each end of said tubular member to plug and seal the ends thereof and form a liquid-tight electrolyte container;
    a liquid electrolyte filling said container and the space between said electrodes;
    means including a switching device by which a unidirectional electrical current is periodically passed through said electrodes and electrolyte in alternating forward and reverse directions for unequal periods of time whereby to effect a net electrolytic transfer of electrode material between said electrodes through said electrolyte; and
    polarity-reversing means for controlling the direction of said net transfer of electrode material between the electrodes to enable the balance of the rotatable body to be adjusted.

6. Electrolytic balancing apparatus as set forth in claim 5 wherein the electrode is formed of lead and the electrolyte comprises an aqueous solution of lead fluoborate.

References Cited by the Examiner

UNITED STATES PATENTS

| Re. 25,752 | 4/1965 | Schroeder | 74—573 |
| Re. 25,800 | 6/1965 | Mullarkey | 74—573 |

OTHER REFERENCES

Electroplating Engineering Handbook, A. K. Graham, The Waverly Press, Inc., Balto., Md., 1962 (Table 13 on page 244 relied on) (copy in Scientific Library).

FRED C. MATTERN, JR., *Primary Examiner.*

PALMER W. SULLIVAN, *Examiner.*